(No Model.) 2 Sheets—Sheet 1.

P. STEUERWALD & A. CORDING.
END GATE FOR WAGONS.

No. 423,189. Patented Mar. 11, 1890.

WITNESSES:
F. McArdle
C. Sedgwick

INVENTOR:
P. Steuerwald
A. Cording
BY Munn & Co.
ATTORNEYS

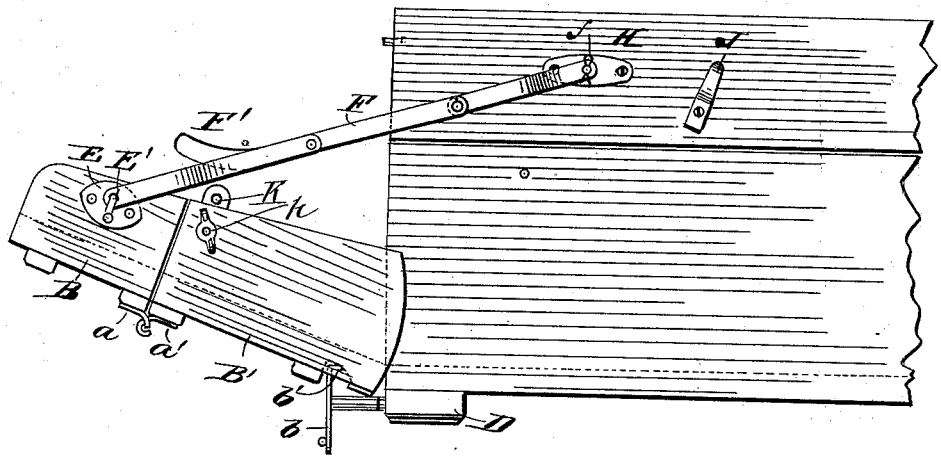
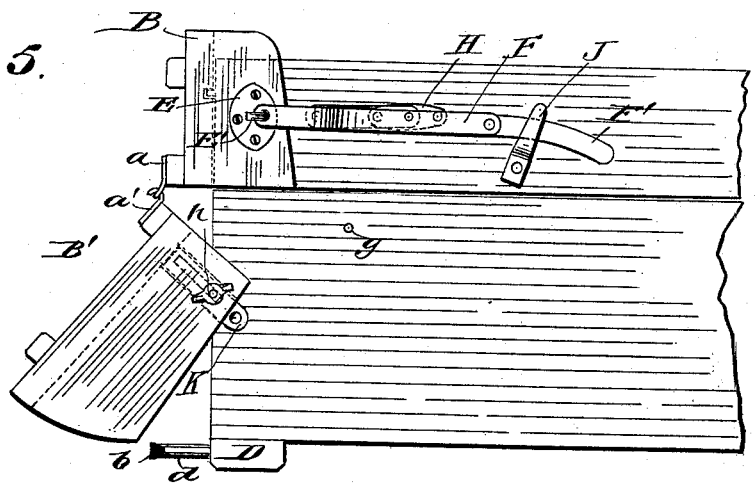
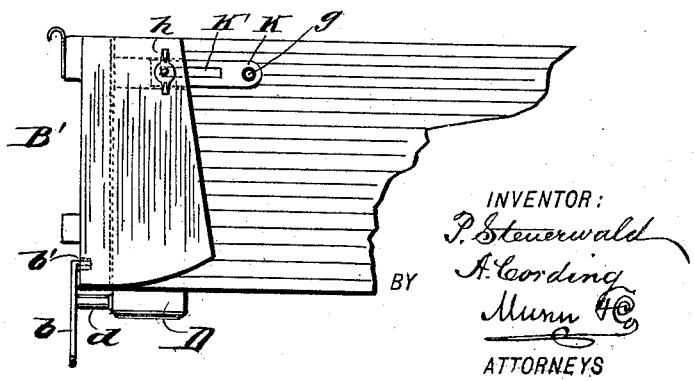

UNITED STATES PATENT OFFICE.

PHILIP STEUERWALD AND ALBERT CORDING, OF SAUNEMIN, ILLINOIS.

END-GATE FOR WAGONS.

SPECIFICATION forming part of Letters Patent No. 423,189, dated March 11, 1890.

Application filed January 20, 1890. Serial No. 337,474. (No model.)

*To all whom it may concern:*

Be it known that we, PHILIP STEUERWALD and ALBERT CORDING, of Saunemin, in the county of Livingston and State of Illinois, have invented a new and Improved End-Gate for Wagons, of which the following is a full, clear, and exact description.

Our invention relates to improvements in end-gates for wagons, and especially for farm-wagons; and the object of our invention is to provide a convenient gate that will securely lock the wagon-box and hold grain or other material, that can be easily converted into a chute or shoveling-board, that may be applied to a wagon with or without a high box, that may be swung upwardly upon the wagon-top when not in use, and that will allow the grain or other matter to be removed from the wagon without removing the gate.

To this end the invention consists in a vertically-separable end-gate having the lower portion hinged to the upper portion, so that it may swing outwardly, the lower portion having a slide and hook by which it may be attached to the wagon-box, and the upper portion being attached to the wagon-box by an extensible lever upon each side thereof. This construction will be hereinafter fully described, and specifically pointed out in the claims.

Reference is to be had to the accompanying drawings, forming a part of this specification, in which similar letters of reference indicate corresponding parts in all the figures.

Figure 1:
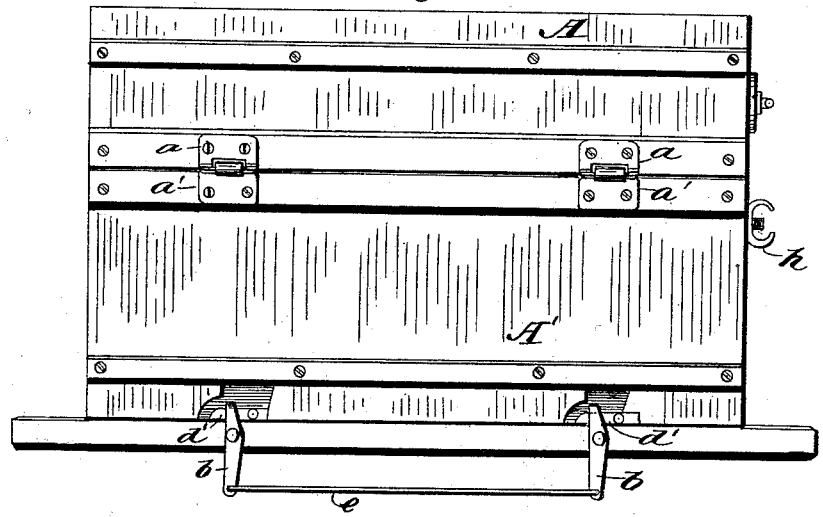
Figure 2:
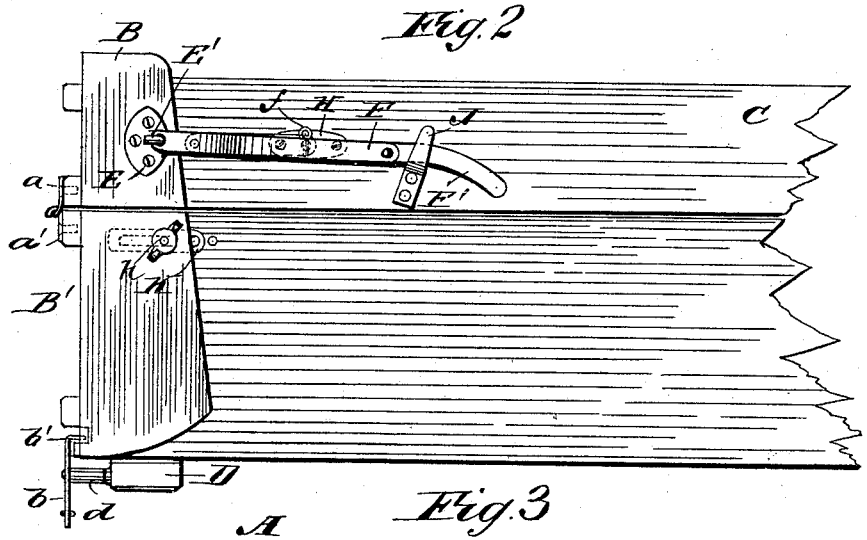
Figure 3:
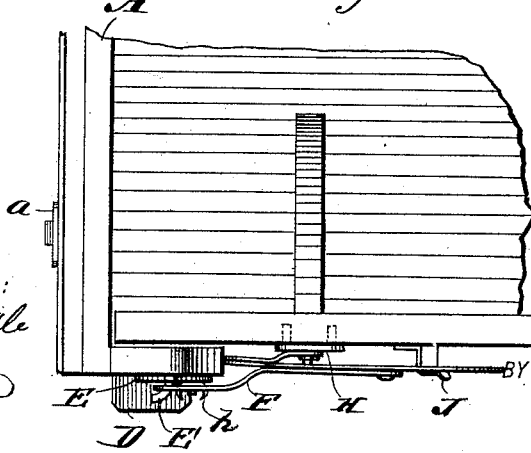

Figure 1 is a front elevation of the gate as applied to a wagon-box. Fig. 2 is an end view of the same, showing a portion of the side of the wagon-box. Fig. 3 is a plan view of one corner of the wagon-box with the gate attached thereto. Fig. 4 is a side elevation of the wagon-box, showing the gate in position to act as a chute or shoveling-board. Fig. 5 is a view showing the lower portion swung outwardly that the grain or other material may be easily removed from the wagon-box, and Fig. 6 is a view of a wagon-box with the upper portion thereof and the upper portion of the end-gate removed.

The end-gate consists of two vertically-separable parts A and A', which are hinged together, as shown, one leaf $a$ of the hinges being attached to the lower outer edge of the upper portion A of the end-gate, and the leaf $a'$ of the hinges being attached to the upper edge of the lower portion A' of the end-gate, the lower leaf $a'$ of the hinge having a curved knuckle that hooks into the upper leaf $a$, so that the parts may be easily unhinged and separated.

Each portion of the end-gate is provided at each end with a wide flange B and B', which overlaps the side of the wagon-box C and fits closely thereon, the lower end of the flange B', which is attached to the lower part of the end-gate A', being curved upwardly, as shown, so that it may swing outwardly without striking the cross-piece D of the wagon-box.

The lower side of the end-gate is held in position by the buttons $b$, which are pivoted to a stem $d$, that is screwed into the cross-piece D, are provided at their upper ends with an inwardly-extending hook $b'$, which engages the upper edge of a plate $d'$ on the lower edge of the part A' of the end-gate, the end-gate being recessed to make room for the hooks, and are connected at their lower ends by a rod $e$, so that both buttons may be turned at one operation.

To the flange B of the part A, upon each side of the wagon-box, is firmly attached a plate E, having a rearwardly-extending hook E', which engages an eye in the end of the extensible lever F, and the upper portion of the gate is thereby held and positioned upon the wagon-box.

The extensible lever F consists of three parts pivoted together so that they may fold one upon the other, the middle section having a handle F', which curves upwardly when the lever is extended, as shown in Fig. 4, and downwardly when the lever is folded, as shown in Figs. 2 and 5.

The forward end of the lever F is pivoted to a plate H, which is firmly attached to the upper side of the wagon-box C. The plate H is provided with a projecting stud which passes through an eye in the end of the lever F, which is held thereon by a key $f$, so that the lever may be removed from the wagon-box by simply removing the key and slipping it from the stud.

When the extensible lever F is in folded position, as shown in Figs. 1 and 2, the end-gate is locked closely to the wagon-box, and the lever is retained in this position by the lug J, which is firmly attached to the wagon-box C, and which is open at the top, so that the handle F' of the extensible lever F may be forced into it.

The lower flange B' of the lower end-gate A' is provided upon its inner side with a slotted slide K, which extends forwardly along the side of the wagon-box and is provided at the end with an eye which engages a pin $g$ upon the wagon-box C, so that the lower part of the end-gate may be thereby fastened to the wagon-box when the upper part is removed.

The slide K is provided with a longitudinal slot K', through which passes a thumb-screw $h$, which fastens the slide to the flange B', and by means of which the slide may be adjusted. When the parts A and A' are used together, the slide K is not hooked upon the pin $g$, as it will prevent the part A' from swinging.

When the end-gate is to be used as a chute the operator raises the handle F' of the extensible lever F from the lug J and forces it backwardly, thus throwing out the upper part of the end-gate, and as the end-gate swings outwardly it will straighten out the lever F, and the lower part will be held by the hooks $b'$ of the buttons $b$ engaging the plates $d'$ of the end-gate, so that the end-gate in this position will form a chute through which matter may be introduced into the wagon-box. This construction and position are clearly shown in Fig. 4.

When the wagon-box is to be emptied, the buttons $b$ are turned down, so as not to engage the plates $d'$, and the lower portion A' of the end-gate may be swung outwardly, as shown in Fig. 5.

If the lower part only is to be used, the upper portion may be removed, as described, and if the end-gate is not in use as an end-gate it may be swung bodily to the top of the wagon-box, upon which it will rest, and may be used for a seat.

By having the flanges B B' of the gate wide, as shown, they will afford means of securely attaching the end-gate to the wagon-box, and will also make suitable sides for the gate when it is used as a chute.

Having thus described our invention, what we claim as new, and desire to secure by Letters Patent, is—

1. An end-gate for wagons, consisting, essentially, of two vertically-separable parts hinged together, as shown, and provided at each end with a flange adapted to overlap the side of the wagon-box, the lower edge of said end-gate being retained upon the wagon-box by suitable buttons, and the upper portion being attached to the wagon-box by an extensible lever, substantially as described.

2. An end-gate for wagons, consisting, essentially, of two vertically-separable parts having flanges adapted to overlap the sides of the wagon-box, the upper portion of said parts being attached to the wagon-box by an extensible lever, and the lower portion of said parts being hinged to the upper portion in such a manner that it may be swung vertically upon its hinges, substantially as described.

3. A vertically-separable end-gate for wagons, consisting, essentially, of the parts A and A', having means, as hinges $a\ a'$, for attaching them together, the flanges B B', attached to the ends of the gate and adapted to overlap the sides of the wagon-box, the plates $d'$, attached to the lower edge of the part A' to engage the hooks $b'$ of the buttons $b$, the slide K, attached to the flange B' and having slot K' and thumb-screw $k$, by which it may be adjusted, and the plate E, attached to the flange B and having a rearwardly-projecting hook E' to engage the end of the extensible lever F, substantially as described.

4. The combination, with the wagon-box C and end-gate A A', having flanges B B' to overlap the wagon-box, having means, as buttons $b$ and plates $d'$, for holding the lower edge thereof, and having plate E, with rearwardly-projecting hook E', attached to the flange B thereof, of the extensible lever F, having the jointed sections, as shown, having an eye in one end to engage the hook E, means, substantially as described, for pivoting it to the wagon-box, and having its middle section provided with a curved handle, as F', by which the lever and the end-gate attached thereto may be operated, substantially as described.

5. The combination, with the wagon-box C, having pins $g$ and cross-piece D, with the buttons $b$ attached thereto, of the lower portion A' of the end-gate, having plates $d'$ to engage the hooks of the buttons $b$, and having slide K, adjustably attached thereto and provided with an eye to engage the pin $g$ and hold the part A' in position upon the wagon-box, substantially as described.

PHIL. STEUERWALD.
ALBERT CORDING.

Witnesses:
WILL E. ROSS,
E. A. MOREHART,